March 1, 1927.

H. W. BELL 1,619,457

FLEXIBLE COUPLING

Filed July 14, 1923

INVENTOR
Harvey W. Bell
BY
E. W. Marshall
ATTORNEY

Patented Mar. 1, 1927.

1,619,457

UNITED STATES PATENT OFFICE.

HARVEY W. BELL, OF ARDSLEY-ON-HUDSON, NEW YORK, ASSIGNOR TO THE BELOYT CORPORATION, OF DOVER, DELAWARE, A CORPORATION OF DELAWARE.

FLEXIBLE COUPLING.

Application filed July 14, 1923. Serial No. 651,598.

This invention relates to flexible couplings or connections and particularly to devices for use in connecting parts of a motor vehicle or vehicle chassis where it is desirable to provide for a limited relative movement between the connected parts, as disclosed, for example, in my pending applications Serial No. 363,189, filed March 4, 1920 for spring suspensions, and Serial No. 651,597, filed July 14, 1923 for flexible couplings.

The invention has been particularly developed for the type of flexible connection comprising links of material strongly resistant to flexure in the plane thereof but adapted to flex in directions transverse thereto, such for instance, as links of rubberized or rubber impregnated fabric. These links are securely clamped to the parts to be connected and this invention has for its salient object to provide a link unit adapted to be rigidly and quickly inserted and clamped in position between the two parts to be connected.

Further objects of the invention will appear from the following description taken in connection with the drawings which form a part of this application and in which, Fig. 1 is a sectional elevation illustrating a flexible coupling constructed in accordance with the invention.

Figure 1:
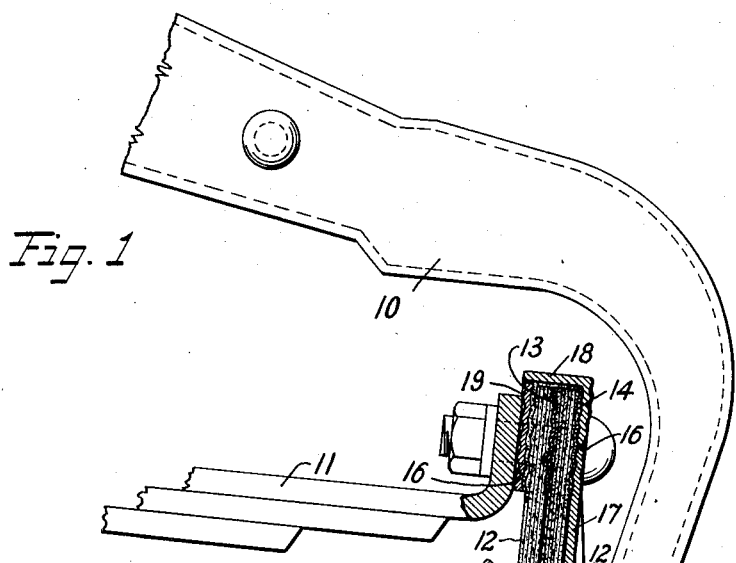

The illustrative form briefly described consists of a link adapted for use in a flexible coupling and comprising preferably a pair of substantially flat links or strips of flexible material strongly resistant to flexure into the plane thereof but adapted to be bent or flexed in planes transverse thereto. These links are preferably formed of material such as rubber impregnated fabric belting and the unit comprises a pair of these links or strips disposed in juxtaposed relation, and united at their ends only by suitable connecting means such, for example, as a sheath of non-metallic material enveloping the ends of the links. A separate sheath is desirably provided for each end. Such sheath may be formed of rubber and is preferably permanently attached to or molded to the links. The sheath and end portions of the links at each end thereof are desirably perforated or provided with coinciding bolt receiving openings. Further details of the invention will appear from the following description.

The coupling has been particularly illustrated as connecting a bracket 10 which is adapted to be secured to the frame of the motor vehicle and to one end of the vehicle spring 11.

The link unit used in the coupling comprises a pair of substantially flat links or strips 12 which are disposed in juxtaposed position and substantially parallel with each other. Intermediate the end portions of the links are interposed washers 13 which are preferably corrugated or roughened to increase the gripping action as hereinafter described.

The links when disposed in the manner set forth have secured to each end portion thereof a sheath 14 of non-metallic material and this sheath may be formed of rubber molded around the ends of the links.

Adjacent each end of the link unit the sheaths, links and washers are perforated as shown at 15 to receive bolts for securing the coupling to the parts to be connected.

Figure 2:
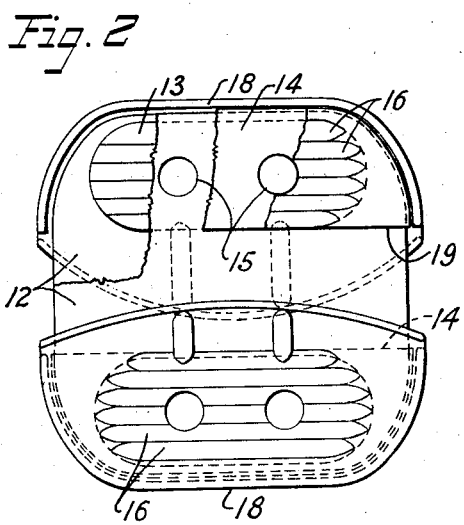
Fig. 2 is an elevational view, partly broken away, of the coupling shown in Fig. 1.
Figure 3:
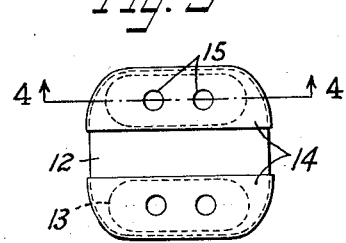
Fig. 3 is an elevational view of the link unit used in the coupling illustrated in Figs. 1 and 2.
Figure 4:
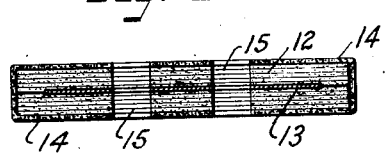
Fig. 4 is a sectional elevation on an enlarged scale taken substantially on line 4—4 of Fig. 3.

The link unit has its end portions surrounded by a casing or box and each of these casings comprises a member 16 having a back wall 17 and a peripheral flange or rim 18 and a clamping plate 19 which as shown in Fig. 2 is received within the flanged portion of the member 16. The wall 17 and the plate 19 are preferably corrugated as illustrated in a manner similar to the washer 13, these corrugated portions increasing the gripping action on the flexible members 12.

From the foregoing description it will be seen that a simple, practical and compact link unit has been designed and that by the use of this unit the installation of the flexible shackles or couplings is facilitated and expedited.

Although one specific embodiment of the invention has been particularly shown and described, it will be understood that the invention is capable of modification and that further changes in the construction and in the arrangement of the various cooperating parts may be made without departing from the spirit or scope of the invention as expressed in the following claims.

What I claim is:

1. A link unit for flexible couplings comprising a pair of links of flexible material disposed in juxtaposed relation and sheaths of non-metallic material surrounding the end portions of said links.

2. A link unit for flexible couplings comprising a pair of links of flexible material strongly resistant to flexure in the plane thereof but flexible in directions transverse thereto and sheaths of non-metallic material surrounding the end portions of said links.

3. A link unit for flexible couplings comprising a pair of links of flexible material disposed in juxtaposed relation and sheaths of non-metallic material surrounding the end portions of said links, said links and sheaths having bolt receiving openings therethrough adjacent the ends of the links.

4. A link unit for flexible couplings comprising a pair of links of flexible material disposed in juxtaposed relation and sheaths of non-metallic material surrounding and molded on the end portions of said links.

5. A link unit for flexible couplings comprising a pair of links of flexible, non-metallic material strongly resistant to flexure in the plane thereof but flexible in directions transverse thereto, and a sheath of non-metallic material enveloping the end portions of the links at each end thereof, said sheaths being permanently secured to the links.

6. A link unit for flexible couplings comprising a plurality of links of flexible material strongly resistant to flexure in the plane thereof but flexible in directions transverse thereto, said link unit having an end portion thereof encased in a sheath of non-metallic material, the sheath enclosing and surrounding the end portion of the link.

7. A link unit for flexible couplings comprising a pair of links of flexible material, washers interposed between the end portions of said links, and flexible binding material uniting said links and said interposed washers at the end portions of the links only.

8. A link unit for flexible couplings comprising a pair of links of flexible material disposed in juxtaposed relation, and connecting means of non-metallic material uniting said links at their end portions only.

9. A link unit for flexible couplings, comprising a plurality of links of flexible material disposed in juxtaposed relation, and flexible means connecting corresponding end portions of the links, and leaving the main body portions of the links free for relative movement, said end portions of the links and said connecting means being provided with coinciding bolt openings therethrough.

In witness whereof, I have hereunto set my hand this 11th day of July, 1923.

HARVEY W. BELL.